US009042704B2

(12) United States Patent
Ueno

(10) Patent No.: US 9,042,704 B2
(45) Date of Patent: May 26, 2015

(54) REPRODUCTION APPARATUS AND CONTROL METHOD THEREOF

(75) Inventor: Shogo Ueno, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/547,281

(22) Filed: Jul. 12, 2012

(65) Prior Publication Data

US 2013/0034338 A1 Feb. 7, 2013

(30) Foreign Application Priority Data

Aug. 4, 2011 (JP) .................................. 2011-171320

(51) Int. Cl.
*H04N 9/80* (2006.01)
*H04N 5/76* (2006.01)
*G11B 27/10* (2006.01)
*G11B 27/11* (2006.01)

(52) U.S. Cl.
CPC ................ *H04N 5/76* (2013.01); *G11B 27/105* (2013.01); *G11B 27/11* (2013.01)

(58) Field of Classification Search
None
See application file for complete search history.

(56) References Cited

U.S. PATENT DOCUMENTS

| 7,466,898 B2 * | 12/2008 | Ohashi ........................ 386/241 |
| 2007/0092220 A1 * | 4/2007 | Tanabe ........................ 386/95 |
| 2009/0097820 A1 * | 4/2009 | Furuyama ................... 386/83 |
| 2012/0308200 A1 * | 12/2012 | DeLuca et al. ............... 386/241 |

FOREIGN PATENT DOCUMENTS

| JP | 2001-210017 | 8/2001 |
| JP | 2002-112201 | 4/2002 |
| JP | 2005-093034 A | 4/2005 |
| JP | 2005-129093 A | 5/2005 |
| JP | 2007-324724 A | 12/2007 |
| JP | 2010-192027 A | 9/2010 |
| WO | 2010137234 A | 12/2010 |

OTHER PUBLICATIONS

Cited in the Dec. 22, 2014 Japanese Office Action, is enclosed without an English Translation, that issued in Japanese Patent Application No. 2011-171321, namely U.S. Appl. No. 13/547,265.
The above foreign patent documents were cited in the Feb. 9, 2015 Japanese Office Action, a copy of which is enclosed without an English Translation, that issued in Japanese Patent Application No. 2011-171320.

* cited by examiner

*Primary Examiner* — Heather Jones
(74) *Attorney, Agent, or Firm* — Cowan, Liebowitz & Latman, P.C.

(57) ABSTRACT

A reproduction apparatus comprises a reproduction unit configured to reproduce image data from a recording medium; a detection unit configured to detect users; and a generation unit configured to generate, for each of a plurality of users, management information for distinguishing a portion that has been reproduced and a portion that has not been reproduced in the image data recorded in the recording medium.

17 Claims, 9 Drawing Sheets

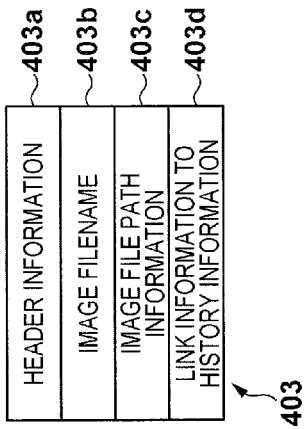
FIG. 4A
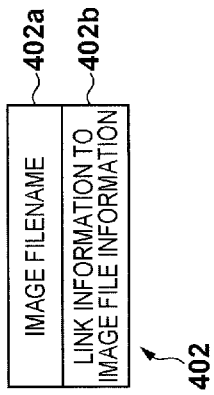
FIG. 4B
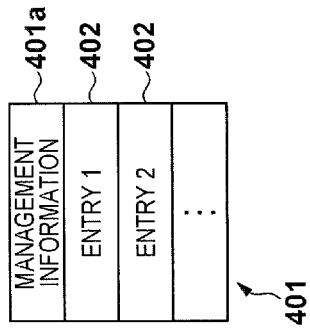
FIG. 4C
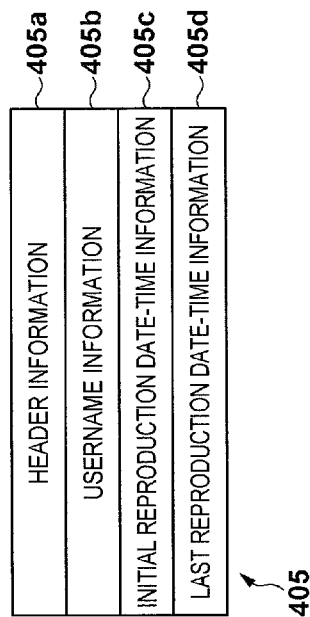
FIG. 4D
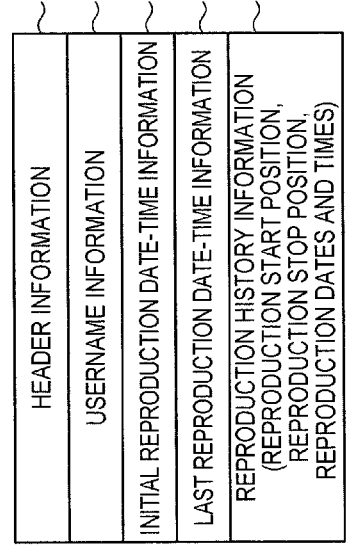

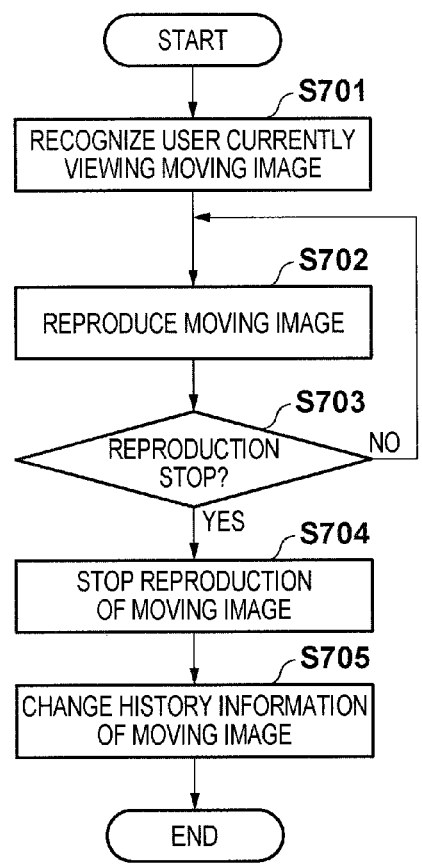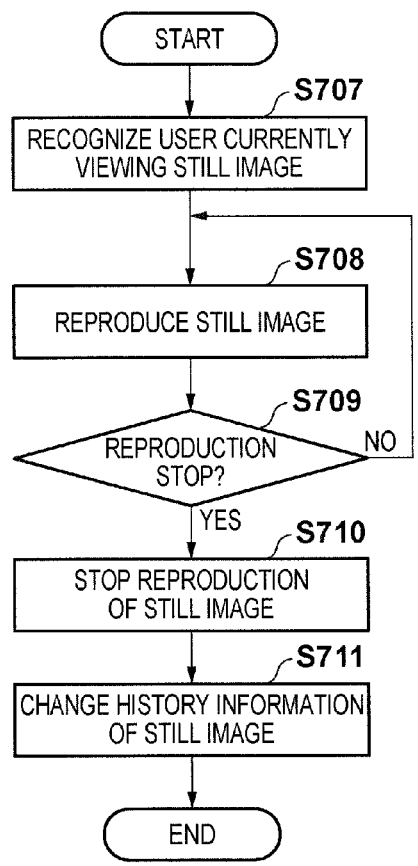

REPRODUCTION APPARATUS AND CONTROL METHOD THEREOF

BACKGROUND OF THE INVENTION

1. Field of the Invention

The present invention relates to control of content reproduction.

2. Description of the Related Art

Conventionally, reproduction apparatuses that read content such as moving images, audio, still images or the like from recording media and reproduce read content are known. Also, apparatuses that store information indicating the stop position in cases where reproduction is stopped part way through reproduction of content (broadcast programs and other programs), and start reproduction from the previous stop position when the same content is next reproduced are also known (e.g., see Japanese Patent Laid-Open No. 2002-112201).

However, even assuming the reproduction stop position is stored, the position where the user stopped reproduction the previous time would, in the case where another user reproduces the same content, be updated to the stop position of the other user. Thus, each user would need to search for the position where he or she stopped reproduction the previous time himself or herself.

SUMMARY OF THE INVENTION

The present invention has been made in consideration of the abovementioned problems, and realizes a reproduction control technique that, even in the case where a plurality of users have reproduced the same content, enables each user to easily confirm the portion that he or she has not reproduced and reproduce that portion.

In order to solve the aforementioned problems, the present invention provides a reproduction apparatus comprising: a reproduction unit configured to reproduce a content; a recognition unit configured to recognize users who are viewing the content reproduced by the reproduction unit; a generation unit configured to generate reproduction history information indicating, for each of a plurality of users, a portion that the user has not viewed in the content, based on a recognition result of the recognition unit; a control unit configured to control the reproduction unit, based on the reproduction history information and the recognition result of the recognition unit during reproduction of the content, wherein the control unit controls the reproduction unit so as to skip a reproduction position of the content to a portion that users recognized by the recognition unit during reproduction of the content have not viewed, in response to a reproduction position skip instruction; and a display unit configured to display information indicating, for each of the plurality of users, the portion that the user has not viewed in the content, based on the reproduction history information.

In order to solve the aforementioned problems, the present invention provides a reproduction apparatus comprising: a reproduction unit configured to reproduce image data from a recording medium; a detection unit configured to detect users; and a generation unit configured to generate, for each of a plurality of users, management information for distinguishing a portion that has been reproduced and a portion that has not been reproduced in the image data recorded in the recording medium.

In order to solve the aforementioned problems, the present invention provides a control method of a reproduction apparatus which reproduces a content, the method comprising: a recognition step of recognizing users who are viewing the reproduced content; a generation step of generating reproduction history information indicating, for each of a plurality of users, a portion that the user has not viewed in the content, based on a recognition result in the recognition step; a control step of controlling reproduction of the content, based on the reproduction history information and the recognition result in the recognition step during reproduction of the content, wherein, in the control step, reproduction of the content is controlled so as to skip a reproduction position of the content to a portion that users recognized in the recognition step during reproduction of the content have not viewed, in response to a reproduction position skip instruction; and a display step of displaying information indicating, for each of the plurality of users, the portion that the user has not viewed in the content, based on the reproduction history information.

In order to solve the aforementioned problems, the present invention provides a control method of a reproduction apparatus which reproduces image data in a recording medium, the method comprising: a detection step of detecting users; and a generation step of generating, for each of a plurality of users, management information for distinguishing portion that has been reproduced and a portion that has not been reproduced in the image data recorded in the recording medium.

According to the present invention, even in the case where a plurality of users have reproduced the same content, each user can easily confirm the portion that he or she has not reproduced and reproduce that portion.

Further features of the present invention will become apparent from the following description of exemplary embodiments (with reference to the attached drawings).

BRIEF DESCRIPTION OF THE DRAWINGS

FIGS. 4A-4D are diagrams illustrating a structure of management information.

FIGS. 7A-7B are flowcharts showing reproduction history storage in the first embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

A reproduction apparatus of the present invention is realized by an apparatus that records and reproduces content (broadcast programs and other programs) consisting of moving images, still images, audio or arbitrary combinations thereof. As for the reproduction apparatus according to the present embodiment, examples include a personal computer having an imaging device such as a web camera; a recording apparatus or reproduction apparatus connected to a digital TV; a digital camcorder; and a games console.

Apparatus Configuration

First, a configuration of the reproduction apparatus according to the present embodiment will be described, with reference to FIG. 1.

Figure 1:
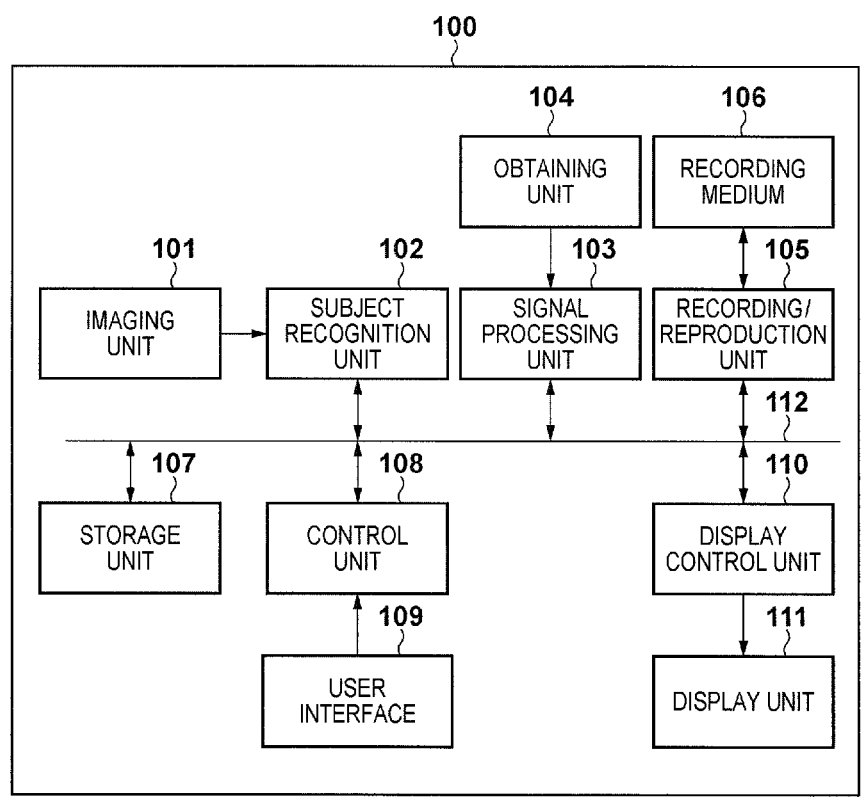
FIG. 1 is a block diagram of a reproduction apparatus of an embodiment according to the present invention.

In FIG. 1, an imaging unit 101 is equipped with a CMOS image sensor or the like, captures an image of a user (subject) who is viewing a moving image or a still image and/or listening to audio reproduced by a reproduction apparatus 100, using photoelectric conversion, and outputs image data resulting from the image capture to a subject recognition unit 102. The subject recognition unit 102 executes face recognition on the image data output from the imaging unit 101, detects a person's face included in the image data, and outputs feature information relating to the detected face (hereinafter, "face information") to a control unit 108. A signal processing unit 103 performs predetermined signal processing on moving image, audio or still image data obtained with an obtaining unit 104 to change the format thereof, and sends the processed data to a recording/reproduction unit 105. Also, the signal processing unit 103, at the time of image reproduction, generates display signals and/or audio signals from the image data and/or audio data reproduced by the recording/reproduction unit 105, and sends the generated signals to the display control unit 110. The recording/reproduction unit 105 records the data acquired from the signal processing unit 103 to a recording medium 106. Also, the recording/reproduction unit 105 reads out moving image, audio or still image data recorded in the recording medium 106. The recording medium 106 is a recording medium capable of being arbitrarily read and written such as a hard disk (HDD) or a flash memory.

A storage unit 107 stores management information relating to moving image, audio or still image data recorded in the recording medium 106, as will be discussed later. The control unit 108 is provided with a microcomputer or a central processing unit (CPU), a memory and the like, and controls operation of the various units of the reproduction apparatus 100, in accordance with programs stored in the memory. A user interface (UI) 109 includes various types of switches operable by a user, receives operation inputs by a user, and outputs the received inputs to the control unit 108. A display control unit 110, in accordance with a control command from the control unit 108, outputs a moving image, still image or the like read out from the recording medium by the recording/reproduction unit 105 or reproduction history information of users, which will be discussed later, to a display unit 111 to be displayed. The display unit 111 includes a liquid crystal panel or the like. A bus 112 functions as a transmission path for transmitting and receiving data, various types of control commands, and the like between the units of the reproduction apparatus 100.

In the reproduction apparatus 100, the obtaining unit 104 includes a communication unit capable of connecting to a well-known camera or microphone or a network. The obtaining unit 104 obtains moving image, audio or still image data, and outputs the obtained data to the signal processing unit 103. The signal processing unit 103 performs predetermined signal processing on the moving image, audio or still image data obtained with the obtaining unit 104, and sends the obtained data to the recording/reproduction unit 105. The recording/reproduction unit 105 records the moving image, audio or still image data to the recording medium 106. In the present embodiment, the recording/reproduction unit 105 manages moving image, audio or still image data recorded in the recording medium 106 as a file, in accordance with the predetermined file system of the reproduction apparatus 100.

User Registration

Next, user registration by the reproduction apparatus 100 of the present embodiment will be described.

When a user operates the UI 109 to instruct new user registration, the control unit 108 controls the imaging unit 101 to capture an image of the user's face. Image data captured by the imaging unit 101 is sent to the subject recognition unit 102. The subject recognition unit 102 detects a person's face from the image data captured with the imaging unit 101, using a well-known face recognition technique, and outputs the detected face information to the control unit 108.

Meanwhile, the control unit 108 controls the display control unit 110 to display an input screen for allowing unique information, such as a username, to be input on the display unit 111. The user operates the UI 109 and inputs user-identification information, such as a username. The control unit 108 associates and stores the face information obtained from the subject recognition unit 102 and the user identification information input using the UI 109 in the storage unit 107.

Content Management Information

Next, the management information of image files recorded in the recording medium 106 will be described, with reference to FIGS. 4A-4D.

The control unit 108 generates management information and stores the generated management information in the storage unit 107, and also updates the contents of management information whenever an image file is newly recorded to the recording medium 106. FIG. 4A illustrates the structure of management information 401. The management information 401 is constituted by a header 401a and entries 402 corresponding to each image file. FIG. 4B illustrates the structure of each entry 402. Each entry 402 includes filename information 402a of a corresponding image file, and link information 402b to the corresponding image file recorded in the recording medium 106. The recording position of the corresponding image file can be detected using the link information 402b. FIG. 4C illustrates image file information 403. Image file information 403 includes image file header information 403a, image filename 403b, image file path information 403c, and link information 403d to history information of the image file (content). The recording position of history information relating to this image file in the recording medium 106 can be detected using this link information 403d.

FIG. 4D illustrates history information 404 and 405. History information 404 is the history information of a moving image file, and history information 405 is the history information of a still image file. History information 404 and 405 respectively include header information 404a and 405a and username information 404b and 405b. Also, history information 404 and 405 include initial reproduction date-time information 404c and 405c respectively, indicating the date and time at which the content was initially reproduced, and last reproduction date-time information 404d and 405d, indicating the date and time at which the content was last reproduced. Also, moving image history information 404 includes reproduction history information 404e, including the reproduction start position and reproduction stop position in corresponding moving image data, and the reproduction dates and times thereof. In the case wherein a user has reproduced a plurality of portions of a moving image, the control unit 108 generates reproduction start position, reproduction stop position and the reproduction dates and times for each reproduced portion, and adds the generated information to the history information 404. Also, in the case where content is reproduced, the control unit 108 executes face recognition of users who are viewing an image and/or listening to audio that is reproduced, and generates history information 404 or 405 for each user who is recognized, as will be discussed later.

Generation and Updating of History Information

Next, generation and updating of history information at the time of image reproduction will be described, with reference to FIGS. 7A-7B. FIG. 7A shows the processing at the time of moving image reproduction, and FIG. 7B shows the processing at the time of still image reproduction. Note that generation and updating of history information in FIGS. 7A-7B are realized by the control unit 108, executing a control program (software) stored in the storage unit 107 and controlling the various units.

First, updating of history information at the time of moving image reproduction in FIG. 7A will be described.

In FIG. 7A, the processing is started when a user operates the UI 109 to select a desired image from a plurality of moving image files recorded in the recording medium 106 and instruct reproduction. First, the control unit 108, as mentioned previously, executes face recognition of the user who is viewing the moving image and listening to the audio that are being reproduced, using the imaging unit 101 and the subject recognition unit 102, and obtains face information of the user (S701). Next, the control unit 108 issues a control command to reproduce the designated moving image file to the recording/reproduction unit 105, and reproduces the designated moving image file from the recording medium 106 (S702). The control unit 108 then controls the signal processing unit 103 and the display control unit 110 to reproduce the image of the reproduced moving image file on the display unit 111. Note that the audio is output from a speaker (not shown).

When reproduction is thus started, the control unit 108 detects the position at which normal reproduction was started, and stores the detected position in the storage unit 107. In the case where the UI 109 is operated during reproduction of the moving image and a fast-forward instruction is received, the control unit 108 sends a control command to the recording/reproduction unit 105 to perform fast-forward reproduction, and also detects the position at which fast-forward reproduction was started as the reproduction stop position, and stores the detected position in the storage unit 107. Also, at this time, the control unit 108 detects the reproduction dates and times based on the output of a timer (not shown), and stores the detected reproduction dates and times in the storage unit 107.

During reproduction of a moving image, the control unit 108 thus generates information indicating the reproduction start position, reproduction stop position and reproduction dates and times, and stores the generated information in the storage unit 107. When there is a reproduction stop instruction from the UI 109 (S703), the control unit 108 then sends a control command to the recording/reproduction unit 105 in order to stop the moving image reproduction (S704). The control unit 108 then updates the reproduction history information of the moving image file that has just been reproduced, based on the information indicating the reproduction start position, reproduction stop position and reproduction dates and times stored in the storage unit 107, and the face information of the user recognized at S701 (S705). That is, the control unit 108 detects the history information 404 of the designated moving image file from the storage unit 107, and detects the username of a registered user by comparing the face information of the user recognized at S701 with the face information of already registered users. The control unit 108 determines whether history information of the detected user is stored in the history information of the moving image file. If history information of the detected user is stored, the control unit 108 then updates the contents of the corresponding history information of the user stored in the storage unit 107, based on the information indicating the reproduction start position, stop position and reproduction dates and times. Also, if history information of the detected user is not stored, history information of the user is newly generated and stored in the storage unit 107.

Next, updating of history information at the time of still image reproduction in FIG. 7B will be described.

The processing of FIG. 7B is started when a user operates the UI 109 to select a desired image from a plurality of still image files recorded in the recording medium 106 and instruct reproduction. First, the control unit 108, as mentioned previously, controls the imaging unit 101 and the subject recognition unit 102 to execute face recognition of the user who is looking at the reproduced still image, and obtains face information of the user (S707). Next, the control unit 108 issues a control command to the recording/reproduction unit 105 so as to reproduce the designated still image file, and reads out the designated still image file from the recording medium 106 and reproduces the read still image file (S708). The control unit 108 then controls the signal processing unit 103 and the display control unit 110 to display the image of the reproduced still image file on the display unit 111. Next, when there is a reproduction stop instruction from the UI 109 (S709), the control unit 108 sends a control command to the recording/reproduction unit 105 so as to stop the still image reproduction (S710). The control unit 108 then updates the reproduction history information of the still image file that has just been reproduced, based on information indicating the reproduction start position, stop position and reproduction dates and times stored in the storage unit 107 and the face information of the user recognized at S708 (S711). This update processing is similar to when updating the history information of a moving image file.

Note that in the above processing, a configuration is adopted in which, in the case where history information of the user detected at S701 or S707 is not stored, history information of the user is newly generated and stored in the storage unit 107. Alternatively, a configuration may be adopted in which, when users have been recognized at the time of moving image or still image reproduction, history information of all recognized users is generated for all moving image and still image files and stored, for example. In this case, a predetermined value indicating null is stored in the initial reproduction dates and times 404c and 405c, the last reproduction dates and times 404d and 405d and the reproduction history information 404e of the history information of moving images and still images that have not been reproduced.

Display of Reproduction History and Cuing

Figure 5:
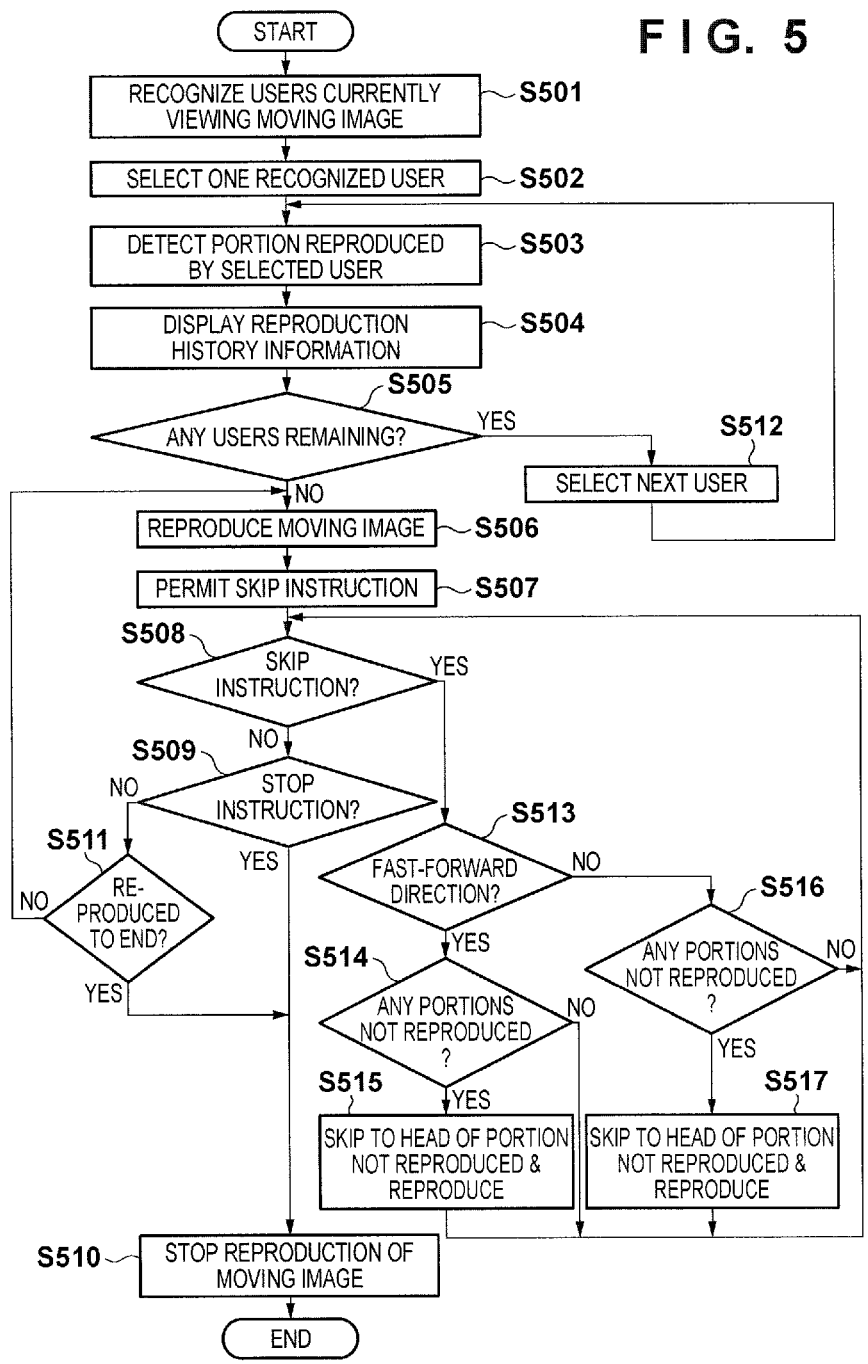
FIG. 5 is a flowchart showing moving image reproduction in the first embodiment.
Figure 6:
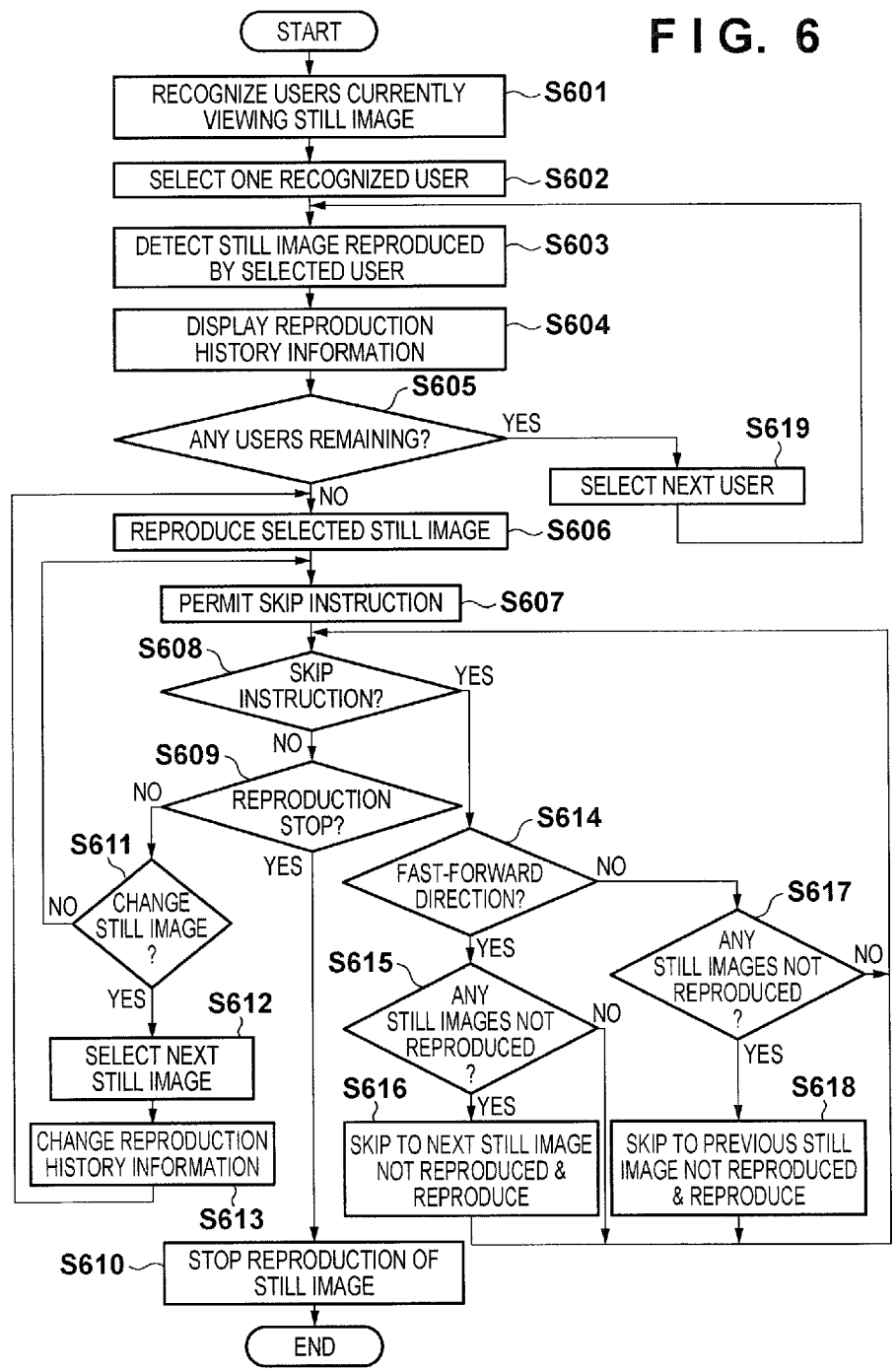
FIG. 6 is a flowchart showing still image reproduction in the first embodiment.

Next, display of reproduction history and cuing at the time of image reproduction will be described, with reference to FIG. 5 and FIG. 6. FIG. 5 shows the processing at the time of moving image reproduction, and FIG. 6 shows the processing at the time of still image reproduction. Note that processing of FIG. 5 and FIG. 6 is executed by the control unit 108 controlling the various units.

First, the processing at the time of moving image reproduction in FIG. 5 will be described.

In FIG. 5, the processing is started when a user operates the UI 109 to select any of a plurality of moving image files recorded in the recording medium 106 and instruct reproduction start. First, the control unit 108 executes face recognition of all users who are currently viewing the reproduced moving image, using the imaging unit 101 and the subject recognition unit 102, and obtains face information of the users. The control unit 108 then detects the usernames of registered users by comparing the face information of each recognized user with the face information of registered users stored in the storage unit 107 (S501). Next, the control unit 108 selects one user from all of the recognized users (S502), and further determines whether history information of the selected user is stored in the history information of the moving image file whose reproduction was instructed. If history information of the detected user is stored, the control unit 108 then detects the portion that the selected user has reproduced in the moving image file whose reproduction was instructed, based on this history information (S503). The control unit 108 then sends a control command to the display control unit 110 to display on the display unit 111 reproduction history information for distinguishing the portions that have and have not been reproduced in the moving image file whose reproduction was instructed (S504). At this time, the control unit 108 causes the reproduction history information to be displayed, so as to be able to distinguish, from the reproduction history information of the other users recognized at S501, portions having the same reproduction dates and times as the currently selected user as reproduced screens that these users watched together.

Figure 2:
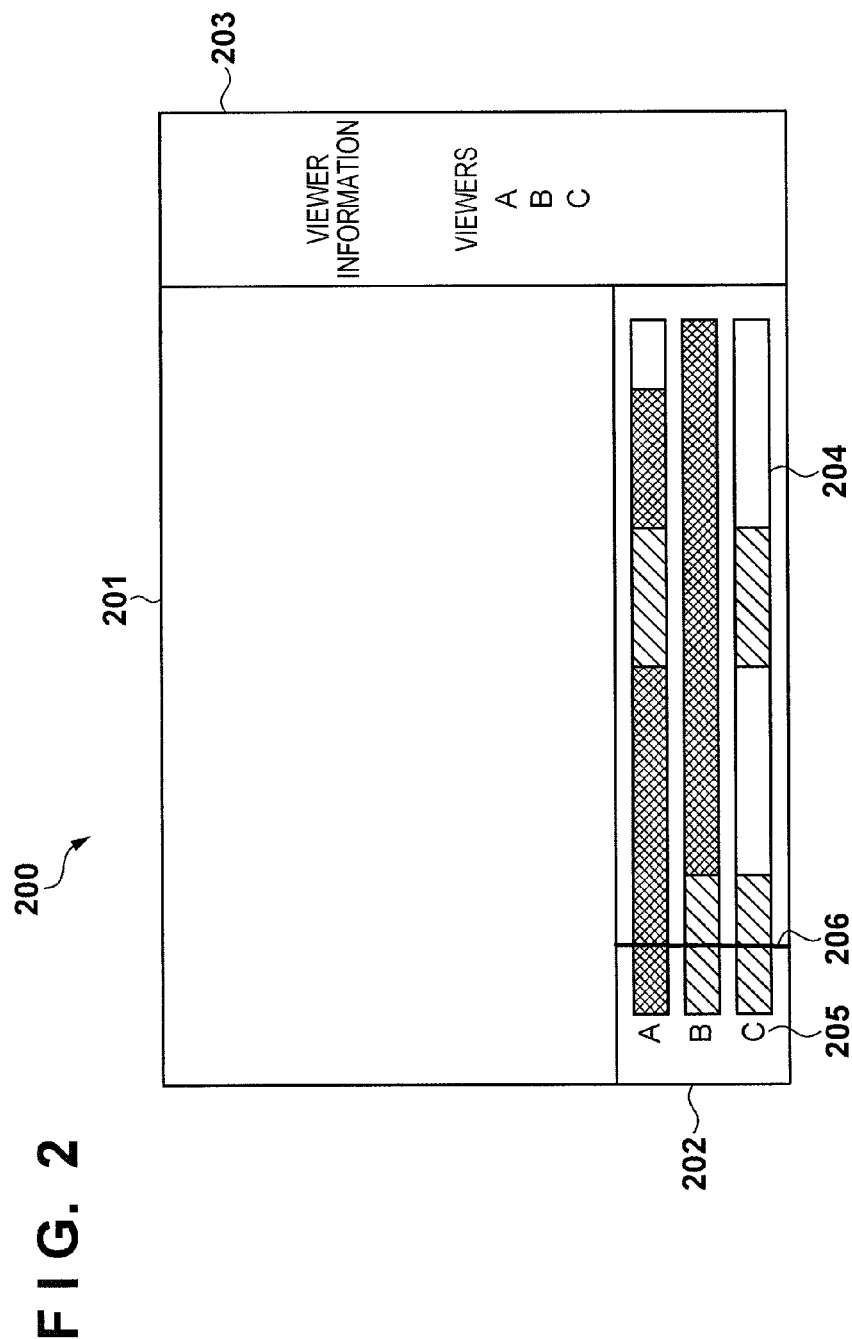
FIG. 2 is a diagram illustrating a moving image reproduction screen.

FIG. 2 illustrates a display screen 200 at the time of moving image reproduction, with the display screen 200 including a moving image display area 201, a reproduction history information display area 202, and an area 203 for displaying information indicating usernames recognized at the start of reproduction.

Usernames 205 of recognized users, here viewers A, B and C, are displayed in the reproduction history information display area 202, and reproduction histories 204 are further displayed in the form of progress bars. In the reproduction histories 204, portions that have been reproduced and portions that have not been reproduced are distinguishably displayed with different colors or shapes. For example, in FIG. 2, the black displayed portions are the portions that have been reproduced and the white displayed portions are the portions that have not been reproduced. Also, the portions shown with diagonal lines are periods during which a plurality of the users were watching the reproduction screen together. The length of the reproduction histories 204 corresponds to the reproduction length of the moving image currently being reproduced. The control unit 108 calculates the display positions corresponding to the reproduced portions in the case where the length of the reproduction histories 204 is taken as the reproduction length of the moving image, based on the reproduction length of the designated moving image and the reproduction start times and end times of the reproduced portions, and displays the result on the screen 200. Also, an indicator 206 indicates the reproduction position in the moving image currently being reproduced. Note that in FIG. 2 display is performed in the case where there are three viewers. A configuration may be adopted in which, in the case where the recognized number of viewers exceeds a predetermined number, the reproduction histories 204 of a predetermined number of users are displayed on the same screen, and the reproduction histories of users that are not displayed can be switched to and displayed.

Returning to the flowchart of FIG. 5, after displaying the reproduction history for a single user at S504, the control unit 108 determined whether there are any remaining users among the users recognized at S501 (S505). If there are any other users remaining, the next user is selected and the processing returns to S503 (S512). Note that the users recognized at S501 are already registered, although in the case where the reproduction history of a recognized user is not stored in the history information of the designated moving image, this will be the first time for that user to reproduce the designated moving image. Thus, with regard to a registered user whose reproduction history information is not stored, the entire period is set as a period during which the moving image has not been reproduced.

When reproduction history display has been completed for all users, the control unit 108 sends a control command to the recording/reproduction unit 105 so as to reproduce the designated moving image file (S506). The recording/reproduction unit 105 reproduces the designated moving image file. The reproduced moving image file is processed by the signal processing unit 103, and displayed by the display control unit 110 in the moving image display area 201 of the display unit 111 shown in FIG. 2.

After starting reproduction of the moving image, the control unit 108 permits a cue (skip) instruction that uses the reproduction histories (S507). The user is able to operate the UI 109 to instruct skipping the reproduction position of the moving image in the fast forward direction or the rewind direction. The control unit 108 determines whether there has been such a skip instruction (S508). If there has been a skip instruction, the control unit 108 determines whether the skip instruction is a fast-forward skip instruction (S513). If the skip instruction is a fast-forward skip instruction, the control unit 108 determines, based on the reproduction histories of all recognized users, whether there are any portions after the current reproduction position that have not been reproduced by the users (S514). If any portions that have not been reproduced are detected, the control unit 108 skips the reproduction position to the head position of the nearest portion that has not been reproduced to the current reproduction position, among the detected portions that have not been reproduced. The moving image is then reproduced normally from the reproduction position skipped to (S515).

Also, the skip instruction is a rewind skip instruction if not a fast-forward skip instruction at S513. Thus, the control unit 108 determines, based on the reproduction histories of all recognized users, whether there are any portions before the current reproduction position that have not been reproduced by the users (S516). If any portions that have not been reproduced are detected, the control unit 108 skips the reproduction position to the head position of the nearest reproduction portion that has not been reproduced to the current reproduction position, among the detected portions that have not been reproduced. The moving image is then reproduced normally from the reproduction position skipped to (S517).

Also, if a portion that has not been reproduced is not detected at S514 or S516, the control unit 108 instructs the display control unit 110 to display information indicating that skipping to a portion that has not been reproduced in accordance with the skip instruction cannot be performed, and continues to reproduce the moving image as is.

Also, if a skip instruction is not detected at S508, the control unit 108 determines whether there has been a reproduction stop instruction from the UI 109 (S509). If there is reproduction stop instruction, the control unit 108 then stops reproduction of the moving image by the recording/reproduction unit 105, and also stops moving image display and reproduction history information display (S510).

Also, if there is not a reproduction stop instruction, the control unit 108 determines whether the moving image has been reproduced to the end (S511). When the moving image has been reproduced to the end, the control unit 108 stops reproduction of the moving image by the recording/reproduction unit 105, and also stops moving image display and reproduction history information display (S510). Also, if the moving image has not been reproduced to the end, the processing returns to S506.

Next, processing at the time of still image reproduction in FIG. 6 will be described.

In FIG. 6, the processing is started when a user operates the UI 109 to select any of a plurality of still image files recorded in the recording medium 106 and instruct the start of reproduction. First, the control unit 108 executes face recognition of all users who are currently viewing the reproduced image, using the imaging unit 101 and the subject recognition unit 102, and obtains face information of the users. The control unit 108 then detects the usernames of registered users, by comparing the face information of each recognized user with the face information of registered users stored in the storage unit 107 (S601). Next, the control unit 108 selects one user from all of the recognized users (S602). Still images that the selected user has reproduced are then detected from all of the still image files recorded in the recording medium 106, based on the reproduction history information of all of the still image files that is stored by the storage unit 107 (S603). The control unit 108 then sends a control command to the display control unit 110, so as to display on the display unit 111 the still image whose reproduction was instructed and reproduction history information for distinguishing whether a predetermined number of still images before and after the still image whose reproduction was instructed have or have not been reproduced (S604). At this time, the control unit 108 causes the reproduction history information to be displayed so as to be able to distinguish, based on the reproduction history information of the other users recognized at S601, still images having the same reproduction dates and times as the currently selected user as reproduction screens that these users were watching together.

Figure 3:
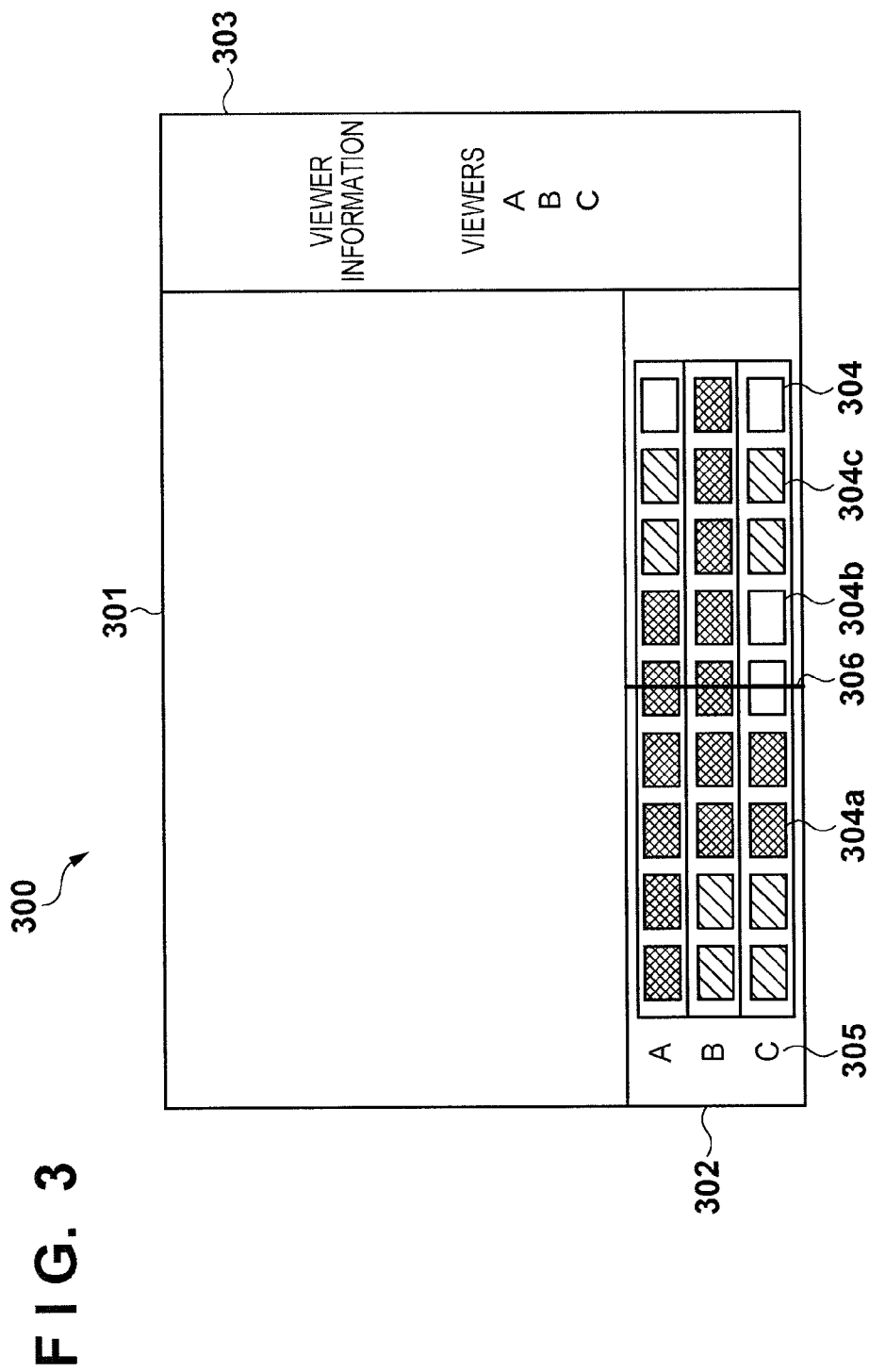
FIG. 3 is a diagram illustrating a still image reproduction screen.

FIG. 3 illustrates a display screen 300 at the time of still image reproduction, with the display screen 300 including a still image display area 301, a reproduction history information display area 302, and an area 303 for displaying information indicating usernames recognized at the start of reproduction.

Recognized usernames 305, here viewers A, B and C, are displayed in the reproduction history information display area 302. Also, the reproduction histories 304 of the still image currently being reproduced and the still images reproduced before and after the current still image are displayed. A plurality of icons 304a, 304b and 304c corresponding to the still images are displayed in the reproduction histories 304. The icon 304a indicates still images that have been reproduced, and the icon 304b indicates still images that have not been reproduced. The icon 304a indicating still images that have been reproduced and the icon 304b indicating still images that have not been reproduced are distinguishably displayed with different colors or shapes. Also, the icon 304c shown with diagonal lines indicates still images reproduced in a state where a plurality of the users were watching the reproduction screen together. Also, the icons displayed vertically in the same positions in the reproduction histories 304 of the users indicate the same still image. Also, an indicator 306 indicates the reproduction position of the still image currently being reproduced. Although the control unit 108 causes reproduction histories relating to four pictures of still images before and after the still image currently being reproduced to be displayed in FIG. 3, the reproduction histories of more still images may be displayed. Also, although the icons of the still images are displayed side by side in order of recording date and time in the present embodiment, a configuration may be adopted in which the icons are arranged in accordance with a condition other than recording date and time.

Returning to the flowchart of FIG. 6, after displaying the reproduction history for one user at S604, the control unit 108 determines whether there are any remaining users among the users recognized at S601 (S605). If there any other users remaining, the next user is selected and the processing returns to S603 (S619). Note that the users recognized at S601 are already registered, although in the case where the reproduction history of a recognized user is not stored in the history information of the designated still image, this will be the first time for that user to reproduce the designated still image. Thus, with regard to a registered user whose reproduction history information is not stored, the designated still image is set as a still image that has not been reproduced.

Also, when reproduction history display has been completed for all of the users, the control unit 108 instructs the recording/reproduction unit 105 to reproduce the designated still image file (S606). The recording/reproduction unit 105 reproduces the designated still image file. The reproduced still image file is processed by the signal processing unit 103, and is displayed by the display control unit 110 in the still image display area 301 of the display unit 111 shown in FIG. 3.

After starting still image reproduction, the control unit 108 permits a cue (skip) instruction that uses the reproduction histories (S607). The user is able to operate the UI 109 to instruct skipping to a still image in the fast-forward direction or the rewind direction. The control unit 108 determines whether there has been such a skip instruction (S608). If there has been a skip instruction, the control unit 108 determines whether the skip instruction is a fast forward skip instruction (S614). If the skip instruction is fast-forward skip instruction, the control unit 108 determines, based on the reproduction histories of all recognized users, whether there are any still images after the still image currently being reproduced that have not been reproduced by the users (S615). If any still images that have not been reproduced are detected, the control unit 108 skips to the nearest still image to the current reproduction position among the detected still images. The still image skipped to is then reproduced (S616).

Also, the skip instruction is a rewind skip instruction if not a fast-forward skip instruction at S614. Thus, the control unit 108 determines, based on the reproduction histories of all recognized users, whether there are any still images before the current reproduction position that have not been reproduced by the users (S617). If any still images that have not been reproduced are detected, the control unit 108 skips to the nearest still image that has not been reproduced to the current reproduction position, among the detected still images. The still image skipped to is then reproduced (S618).

Also, if a still image that has not been reproduced is not detected at S615 and S617, the control unit 108 instructs the display control unit 110 to display information indicating that skipping to a still image that has not been reproduced in accordance with the skip instruction cannot be performed, and continues to reproduce the still image as is.

Also, in the case where a skip instruction is not detected at S608, the control unit 108 determines whether there has been a reproduction stop instruction from the UI 109 (S609). When there is a reproduction stop instruction, the control unit 108 then stops reproduction of the still image by the recording/reproduction unit 105, and also stops still image display and reproduction history information display (S610).

Also, if there is not a reproduction stop instruction, the control unit 108 determines whether there has been a still image change instruction from the UI 109 (S611). If there has been a still image change instruction, the control unit 108 selects the next still image in order of recording date and time (S612). The control unit 108 then changes the reproduction history display according to the change in the still image to be reproduced, returns to S606, and sends a control command to the recording/reproduction unit 105 so as to reproduce the designated still image file.

Note that the generation and updating of history information shown in FIGS. 7A-7B are performed at the same time as the processing of FIG. 5 and FIG. 6.

In this way, in the present embodiment, users who are viewing a moving image or still image are recognized during reproduction of the moving image or still image, and history information for distinguishing portions (still images) that have been reproduced and portions (still images) that have not been reproduced is generated for each user and stored. When reproducing a moving image, history information for distinguishing portions that each user has and has not reproduced is displayed together with the current reproduction position.

Thus, each user is able to easily recognize portions that other users have and have not reproduced, and is able to easily locate portions that other users have not reproduced and reproduce those portions.

Furthermore, in the present embodiment, because a portion that another user has not reproduced is automatically cued and reproduced when skip is instructed, portions that other users have not reproduced can be easily reproduced.

Note that in the present embodiment, a configuration is adopted in which users are recognized at the start of moving image or still image reproduction, the reproduction histories of recognized users are displayed, and the reproduction history display is not changed even if the users fluctuate during reproduction. However, a configuration may be adopted in which a change in users during reproduction is detected, and the displayed reproduction history information is changed in accordance with the users whenever a change in users is detected.

A configuration may also be adopted in the processing of FIGS. 7A-7B in which a change in users during reproduction is detected, and reproduction history information is updated whenever a change in users is detected.

Also, although recognition of users is performed based on the face information of users in the present embodiment, users can also be recognized with methods other than this. For example, a function for recognizing biological information such as fingerprints or a function for reading information on an ID card possessed by users may be installed in the reproduction apparatus 100.

Second Embodiment

Next, the system configuration of the second embodiment will be described with reference to FIG. 8 and FIGS. 9A-9B.

Figure 8:
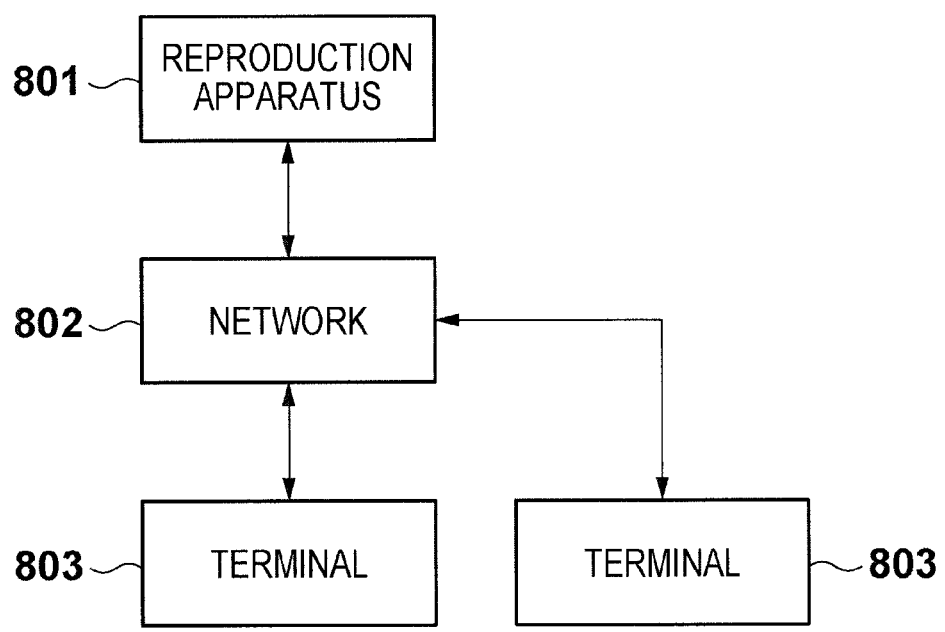
FIG. 8 is a diagram showing a system configuration of the second embodiment.

In FIG. 8, a reproduction apparatus 801 is provided with a similar configuration and functions to the reproduction apparatus of FIG. 1. Also, in the present embodiment, the reproduction apparatus 801 communicates with a plurality of reproduction terminals 803 via a network 802. The reproduction apparatus 801 reproduces moving images and still images according to reproduction requests from the reproduction terminals 803, and transmits reproduced moving image and still image data to the reproduction terminals 803 via the network 802. Also, face information of users and distinguishing information of the respective terminals are received from the reproduction terminals 803 via the network 802.

Figure 9A:
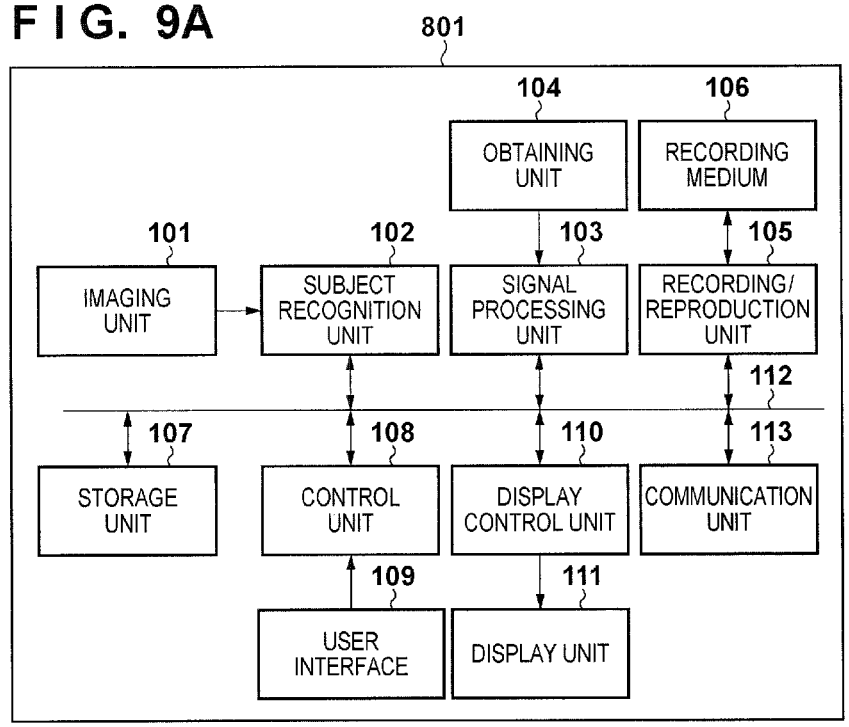
FIGS. 9A-9B are block diagrams of a reproduction apparatus and a reproduction terminal constituting the system of the second embodiment.

FIG. 9A is a block diagram of the reproduction apparatus 801. The reproduction apparatus 801 is provided with a communication unit 113, in addition to the configuration of the reproduction apparatus 100 of FIG. 1. The communication unit 113 communicates with the reproduction terminals 803 via the network 802. With regard to the remaining configuration, the same reference signs are given to a configuration that is similar to FIG. 1, and description thereof is omitted.

Figure 9B:
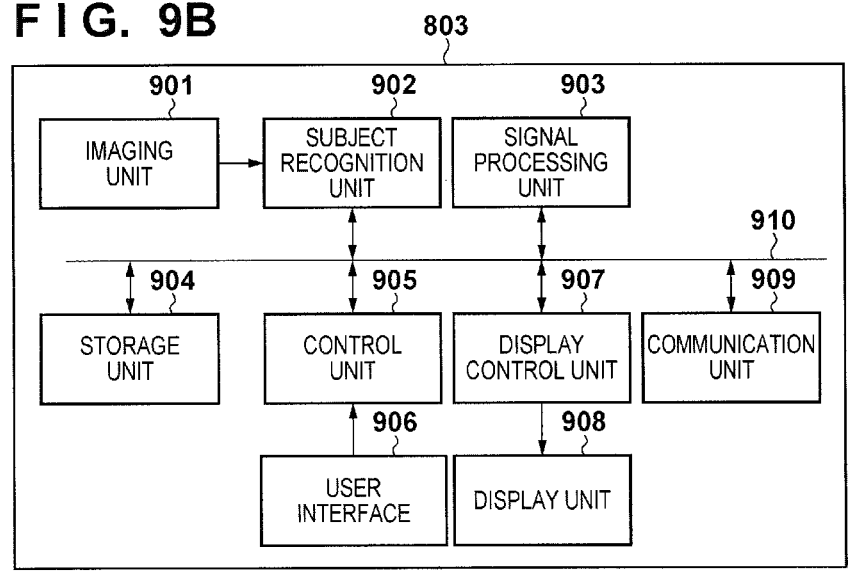

FIG. 9B is a block diagram of the reproduction terminals 803. In each reproduction terminal 803, an imaging unit 901, a subject recognition unit 902, a control unit 905, a UI 906, a display unit 908 and a bus 910 have similar functions to the imaging unit 101, the subject recognition unit 102, the control unit 108, the UI 109, the display unit 111 and the bus 112 of FIG. 1.

The storage unit 904 stores distinguishing information for distinguishing the reproduction terminal 803, face information from the subject recognition unit 902, and the like. The display control unit 907 outputs a moving image or still image received by the communication unit 909 from the reproduction apparatus 801 or reproduction history information of a user which will be discussed later to the display unit 908 to be displayed, in accordance with a control command from the control unit 905. The communication unit 909 communicates with the reproduction apparatus 801 in accordance with a control command from the control unit 905.

User Registration

Next, user registration according to the present embodiment will be described. In the present embodiment, user registration is possible using not only the reproduction apparatus 801 but also the reproduction terminals 803. Since user registration using the reproduction apparatus 801 is similar to the first embodiment, user registration using the reproduction terminals 803 will be described here.

When a user operates the UI 906 to instruct new user registration, the control unit 905 controls the imaging unit 901 to capture an image of the user's face. Image data captured by the imaging unit 901 is sent to the subject recognition unit 902. The subject recognition unit 902 detects a person's face from the image data captured with the imaging unit 901, using a well-known face recognition technique, and stores the detected face information in the storage unit 904.

Meanwhile, the control unit 905 controls the display control unit 907 to display on the display unit 908 an input screen for allowing unique information such as a username to be input. The user operates the UI 906 to input user identification information, such as a username. The control unit 905 sends a control command to the communication unit 909, so as to associate and transmit the face information stored in the storage unit 904 and the user identification information input using the UI 906 to the reproduction apparatus 801 together with a user registration request. After transmitting the user registration request, the communication unit 909 transmits the face information and the user identification information to the reproduction apparatus 801.

The communication unit 113 of the reproduction apparatus 801 notifies the control unit 108 that a user registration request has been received from the reproduction terminal 803. The face information and user identification information transmitted following the user registration request are output to the control unit 108, and the control unit 108 associates and stores the face information and user identification information in the storage unit 107.

Generation and Updating of History Information

Next, generation and updating of history information at the time of image reproduction will be described. Note that the processing in the reproduction apparatus 801 is similar to the first embodiment, and the generation and updating of history information in response to a reproduction instruction from a reproduction terminal 803 is also mostly similar to the processing of FIGS. 7A-7B, except for the moving image or still image being reproduced in response to a request from a reproduction terminal 803. Thus, the processing at the time of reproduction in response to a reproduction request from a reproduction terminal 803 will be described.

In the reproduction terminal 803, when a user operates the UI 906 to instruct a reproduction request, the control unit 905 sends a control command to the communication unit 909 so as to request transmission of an image list from the reproduction apparatus 801. The communication unit 909 requests a list of images recorded in the recording medium 106 from the reproduction apparatus 801. The control unit 108 of the reproduction apparatus 801 generates a list of image files recorded in the recording medium 106, and transmits the generated list using the communication unit 113.

In the reproduction terminal 803, the list of the image files thus transmitted is displayed on the display unit 908. When a user operates the UI 906 to select a desired image from the displayed list and instruct reproduction, the control unit 905 transmits the filename of the designated image file and a reproduction request to the reproduction apparatus 801 using the communication unit 909. Also, the control unit 905, as mentioned previously, executes face recognition of the user who is viewing the moving image and listening to the audio that are reproduced, using the imaging unit 901 and the subject recognition unit 902, obtains face information of the user, and transmits the acquired face information to the reproduction apparatus 801 using the communication unit 909.

The control unit 108 of the reproduction apparatus 801 issues a control command to the recording/reproduction unit 105 so as to reproduce the designated moving image file, in response to the reproduction request from the reproduction terminal 803. The recording/reproduction unit 105 reproduces the designated moving image file from the recording medium 106. The control unit 108 then transmits the reproduced moving image data to the reproduction terminal 803 using the communication unit 113.

When reproduction is thus started, the control unit 108 detects distinguishing information of the reproduction terminal 803 transmitted together with the reproduction request and the reproduction start position at which normal reproduction was started, and stores the detected information in the storage unit 107. Also, the control unit 108 sends a control command to the recording/reproduction unit 105 so as to perform fast-forward reproduction in the case where a fast-forward instruction is received from the reproduction terminal 803 during reproduction of the moving image, and also detects the position at which fast-forward reproduction started as a reproduction stop position, and stores the detected position in the storage unit 107. Also, at this time, the control unit 108 detects reproduction dates and times based on the output of a timer (not shown), and stores the detected reproduction dates and times in the storage unit 107.

In this way, during reproduction of a moving image, the control unit 108 generates information indicating the reproduction start position and stop position and the reproduction dates and times, and stores the generated information in the storage unit 107. When there is a reproduction stop instruction from the reproduction terminal 803, the control unit 108 then stops reproduction of the moving image by the recording/reproduction unit 105, and stops transmission of the moving image data to the reproduction terminal 803 using the communication unit 113. The control unit 108 updates the reproduction history information of the moving image file that has just been reproduced, based on the information indicating the reproduction start position, stop position and reproduction dates and times stored in the storage unit 107, the distinguishing information of the reproduction terminal, and the face information of the user transmitted from the reproduction terminal 803. That is, the control unit 108 detects the history information 404 of the designated moving image file from the storage unit 107. The username of a registered user is detected by comparing face information transmitted from the reproduction terminal 803 with the face information of registered users. The control unit 108 determines whether history information of the detected user is stored in the history information of the moving image file. If history information of the detected user is stored, the control unit 108 updates the contents of the history information of the corresponding user stored in the storage unit 107, based on the information indicating the reproduction start position, stop position and reproduction dates and times and the identification information of the reproduction terminal. Also, in the case where history information of the detected user is not stored, history information of the user is newly generated and stored in the storage unit 107. In the present embodiment, the distinguishing information of the reproduction terminal 803 is stored in the history information 404, in addition to the reproduction start position, stop position and reproduction dates and times.

The processing at the time of the still image reproduction in response to a reproduction request from a reproduction terminal 803 is similar to the processing of FIGS. 7A-7B, except for the still image being reproduced in response to a reproduction request from a reproduction terminal 803. Also, in the present embodiment, distinguishing information of the reproduction terminal 803 is added to the history information 405 of the still image file and stored.

Display of History Information and Cuing

The processing in the reproduction apparatus 801 is similar to the first embodiment. Also, display of reproduction history in response to a reproduction request from a reproduction terminal 803 is similar to the first embodiment, except for history information being generated in response to a reproduction request from a reproduction terminal 803 and transmitted to the reproduction terminal 803. Also, the reproduction terminal 803 transmits the face information of each recognized user to the reproduction apparatus 801 together with the reproduction request. The reproduction apparatus 801 generates reproduction history information, based on the face information transmitted from the reproduction terminal 803.

Note that in the present embodiment, if, in the case of displaying the reproduction histories 204 of FIG. 2, not only the reproduction dates and times but the reproduction terminal is the same between users with regard to portions that have been reproduced, the reproduction histories are displayed so as to be able to distinguish that this is the case. Also, if, in the case of displaying the reproduction histories 304 of FIG. 3, the reproduction terminal is the same for the icons of still images that have been reproduced, the reproduction histories are displayed so as to be able to distinguish that this is the case.

Other Embodiments

Aspects of the present invention can also be realized by a computer of a system or apparatus (or devices such as a CPU or MPU) that reads out and executes a program recorded in a memory device to perform the functions of the above-described embodiment(s), and by a method, the steps of which are performed by a computer of a system or apparatus by, for example, reading out and executing a program recorded in a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-171320, filed Aug. 4, 2011, which is hereby incorporated by reference herein in its entirety.

What is claimed is:

1. A reproduction apparatus comprising:
an output unit configured to output image data reproduced by a reproduction unit to a display device;
a recognition unit configured to recognize users who are viewing an image relating to the image data reproduced by said reproduction unit;
a generation unit configured to generate, for each of a plurality of users, reproduction history information for distinguishing a portion that has been viewed and a portion that has not been viewed in the image data, based on a recognition result of said recognition unit;
a control unit configured to control said reproduction unit, based on the reproduction history information and the recognition result of said recognition unit during reproduction of predetermined image data having a portion that is indicated by the reproduction history information and has been viewed by the user recognized by the recognition unit and a portion that is indicated by the reproduction history information and has not been viewed by the user recognized by the recognition unit,
wherein the control unit controls the reproduction unit to reproduce the portion that has been viewed in the predetermined image data;
a receiving unit configured to receive a skip instruction for instructing to skip a reproduction position of image data being reproduced by said reproduction unit,
wherein said control unit controls said reproduction unit, in response to the skip instruction received by said receiving unit during reproduction of the potion that has been viewed in the predetermined image data, so as to skip a reproduction position of the predetermined image data to the portion that has not been viewed in the predetermined image data.

2. The apparatus according to claim 1, wherein said generation unit updates, for each of the plurality of users included in the reproduction history information, the portion that has not been viewed, in response to reproduction of the image data being stopped.

3. The apparatus according to claim 1, further comprising:
a communication unit configured to communicate with another reproduction terminal,
wherein said generation unit generates the reproduction history information in response to image data reproduction request from the reproduction terminal, and
said control unit updates the reproduction history information, in a case where there is an instruction to stop reproduction of the image data whose reproduction was instructed by the reproduction terminal.

4. The apparatus according to claim 1, wherein said output unit outputs information indicating the portion that has not been viewed in the predetermined image data to the display device, based on a reproduction length of the image data and a length of the portion not viewed that is indicated by the reproduction history information.

5. The apparatus according to claim 1, wherein said output unit outputs information indicating the portion that has not been viewed in the predetermined image data to the display device, based on the reproduction history information, and further outputs information indicating a portion that has been viewed in the predetermined image data by a plurality of users, based on the reproduction history information.

6. A reproduction apparatus comprising:
an output unit configured to output image data reproduced from a recording medium to a display device;
a detection unit configured to detect users;
a generation unit configured to generate, for each of a plurality of users, management information for distinguishing a portion that has been reproduced and a portion that has not been reproduced in the image data recorded in the recording medium;
a control unit configured to control said output unit in accordance with a detection result of said detection unit and the management information generated by said generation unit,
wherein the control unit controls said output unit, during reproduction of predetermined image data having the portion that has been reproduced and the portion that has not been reproduced, for the user detected by said detection unit, such that the display device displays in the same screen history information, relating to the user detected by said detection unit, for discriminating the portion that has been reproduced and the portion that has not been reproduced in the predetermined image data and an image relating to the image data being reproduced from the recording medium by a reproduction unit.

7. The apparatus according to claim 6, wherein if said detection unit detects a plurality of users, said control unit controls said output unit such that the display device displays in the same screen the history information, relating to each of the plurality of users detected by said detection unit, for distinguishing the portion that has been reproduced and the portion that has not been reproduced in the predetermined image data and the image relating to the predetermined image data being reproduced by said reproduction unit, based on the management information.

8. The apparatus according to claim 6, further comprising:
a receiving unit configured to receive a skip instruction for instructing to skip a reproduction position of image data being reproduced by said reproduction unit,
wherein said control unit further controls said reproduction unit, in response to the skip instruction received by said receiving unit during reproduction of the predetermined image data, so as to skip a reproduction position of the predetermined image data to the portion that the user detected by said detection unit has not reproduced, based on the management information.

9. A control method of a reproduction apparatus which reproduces image data, the method comprising:
recognizing users who are viewing an image relating to the reproduced image data to a display device;
generating, for each of a plurality of users, reproduction history information for distinguishing a portion that has been viewed and a portion that has not been viewed in the image data, based on a recognition result in said recognizing;
reproducing predetermined image data having a portion that is indicated by the reproduction history information and has been viewed by the user recognized in said recognizing and a portion that is indicated by the reproduction history information and has not been viewed by the user recognized in said recognizing;

receiving a skip instruction for instructing to skip a reproduction position of image data being reproduced; and skipping a reproduction position of the predetermined image data, in response to the skip instruction received during reproduction of the portion that has been viewed in the predetermined image data, to the portion that has not been viewed in the predetermined image data, based on the reproduction history information and the recognition result in said recognizing during reproduction of the predetermined image data.

10. The method according to claim 9, wherein in said generating, for each of the plurality of users included in the reproduction history information, the portion that has not been viewed is updated, in response to reproduction of the image data being stopped.

11. The method according to claim 9, further comprising:
communicating with another reproduction terminal,
wherein, the reproduction history information is generated in response to image data reproduction request from the reproduction terminal, and
the reproduction history information are updated, in a case where there is an instruction to stop reproduction of the image data whose reproduction was instructed by the reproduction terminal.

12. The method according to claim 9, further comprising:
outputting information indicating the portion that has not been viewed in the predetermined image data to the display device based on a reproduction length of the image data and a length of the portion not viewed that is indicated by the reproduction history information.

13. A control method of an image processing apparatus comprising:
outputting image data reproduced from a recording medium to a display device;
detecting users;
generating, for each of a plurality of users, management information for distinguishing a portion that has been reproduced and a portion that has not been reproduced in the image data recorded in the recording medium; and
controlling said outputting in accordance with a detection result in said detecting and the management information generated in said generating,
wherein said controlling controls said outputting during reproduction of predetermined image data having the portion that has been reproduced and the portion that has not been reproduced, for the user detected in said detecting, such that the display device displays in the same screen history information, relating to the user detected in said detecting, for discriminating the portion that has been reproduced and the portion that has not been reproduced in the predetermined image data and an image relating to the image data being reproduced from the recording medium.

14. The method according to claim 13, wherein if a plurality of users are detected in said detecting, said controlling controls said outputting such that the display device displays in the same screen the history information, relating to each of the plurality of users detected in said detecting, for distinguishing the portion that has been reproduced in the predetermined image data and the image relating to the predetermined image data being reproduced, based on the management information.

15. The method according to claim 13, further comprising:
receiving a skip instruction for instructing to skip a reproduction position of image data being reproduced,
wherein, the reproduction of the image data is controlled, in response to the skip instruction received during reproduction of the predetermined image data, so as to skip a reproduction position of the predetermined image data to the portion that the user detected in said detecting has not reproduced, based on the management information.

16. A non-transitory computer-readable storage medium storing a program for causing a computer to execute the control method according to claim 9.

17. A non-transitory computer-readable storage medium storing a program for causing a computer to execute the control method according to claim 13.

* * * * *